(12) United States Patent
Jeon et al.

(10) Patent No.: US 11,340,972 B1
(45) Date of Patent: May 24, 2022

(54) ERROR CATEGORIZATION BASED ON BIT INFORMATION

(71) Applicant: Seagate Technology LLC, Cupertino, CA (US)

(72) Inventors: Seokhun Jeon, Gyeonggi-do (KR); MinGyeong Son, Seoul (KR); Seung Youl Jeong, Gyeonggi-do (KR)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/791,220

(22) Filed: Feb. 14, 2020

Related U.S. Application Data

(63) Continuation of application No. 15/404,156, filed on Jan. 11, 2017, now Pat. No. 10,585,732.

(51) Int. Cl.
*G06F 11/00* (2006.01)
*G06F 11/07* (2006.01)
*G06F 11/10* (2006.01)

(52) U.S. Cl.
CPC ........ *G06F 11/0727* (2013.01); *G06F 11/079* (2013.01); *G06F 11/0763* (2013.01); *G06F 11/0793* (2013.01); *G06F 11/1092* (2013.01)

(58) Field of Classification Search
None
See application file for complete search history.

(56) References Cited

U.S. PATENT DOCUMENTS

| | | | |
|---|---|---|---|
| 7,653,862 B2 | 1/2010 | Hassner et al. | |
| 7,903,268 B2 * | 3/2011 | Aoki | G03G 15/5012 358/1.14 |
| 9,059,742 B1 | 6/2015 | Anderson et al. | |
| 9,397,703 B2 * | 7/2016 | Ghaly | G11C 29/42 |
| 10,140,180 B1 * | 11/2018 | Sridhara | H03M 13/29 |
| 10,177,791 B1 * | 1/2019 | Sridhara | H03M 13/2909 |
| 10,324,648 B1 * | 6/2019 | Goss | G11C 16/349 |
| 2004/0003337 A1 * | 1/2004 | Cypher | G11C 29/42 714/763 |
| 2010/0157786 A1 * | 6/2010 | Akita | H04L 27/2602 370/210 |
| 2015/0089278 A1 * | 3/2015 | Patapoutian | G06F 11/1048 714/6.12 |
| 2015/0339187 A1 * | 11/2015 | Sharon | G06F 11/1068 714/766 |

(Continued)

OTHER PUBLICATIONS

S. Tanakamaru, Y. Yanagihara and K. Takeuchi, "Error-Prediction LDPC and Error-Recovery Schemes for Highly Reliable Solid-State Drives (SSDs)," in IEEE Journal of Solid-State Circuits, vol. 48, No. 11, pp. 2920-2933, Nov. 2013, doi: 10.1109/JSSC.2013. 2280078. (Year: 2013).*

*Primary Examiner* — Daniel F. McMahon
(74) *Attorney, Agent, or Firm* — Kirk A. Cesari; Christian W. Best

(57) ABSTRACT

Systems and methods are disclosed for categorizing error types encountered in data access operations based on bit information from a data segment. An example apparatus includes a circuit configured to perform error recovery for one or more data segments including determining an error recovery operation of a plurality of error recovery operations to perform based on bit information of the one or more data segments. The example circuit also performs the determined error recovery operation.

20 Claims, 4 Drawing Sheets

(56) References Cited

U.S. PATENT DOCUMENTS

| | | | |
|---|---|---|---|
| 2016/0056989 A1* | 2/2016 | Murakami | H04L 27/34 375/298 |
| 2017/0163287 A1* | 6/2017 | Parthasaralhy | H03M 13/1108 |
| 2018/0013451 A1* | 1/2018 | Kaynak | H03M 13/1128 |

* cited by examiner

ERROR CATEGORIZATION BASED ON BIT INFORMATION

CROSS-REFERENCE TO RELATED APPLICATIONS

The present application is a continuation of and claims priority to pending U.S. patent application, application Ser. No. 15/404,156, filed Jan. 11, 2017, entitled "ERROR CATEGORIZATION BASED ON BIT INFORMATION," the contents of which are hereby incorporated by reference in their entirety.

SUMMARY

An apparatus may include circuit configured to perform error recovery for one or more data segments including determining an error recovery operation of a plurality of error recovery operations to perform based on bit information of the one or more data segments. The circuit may also perform the determined error recovery operation.

An apparatus may include an error recovery circuit configured to determine an error recovery operation of a plurality of error recovery operations to perform based on bit information of one or more failed data segments. The error recovery circuit may also be configured to perform the determined error recovery operation.

A method may include gathering bit information from a buffer of a decoder that failed to recover one or more data segments. The method may further determine an error type of a plurality of error types based on the bit information of the one or more data segments.

These and other features and benefits that characterize various embodiments of the disclosure can be understood in view of and upon reading the following detailed description and review of the associated drawings.

DETAILED DESCRIPTION

Figure 1:
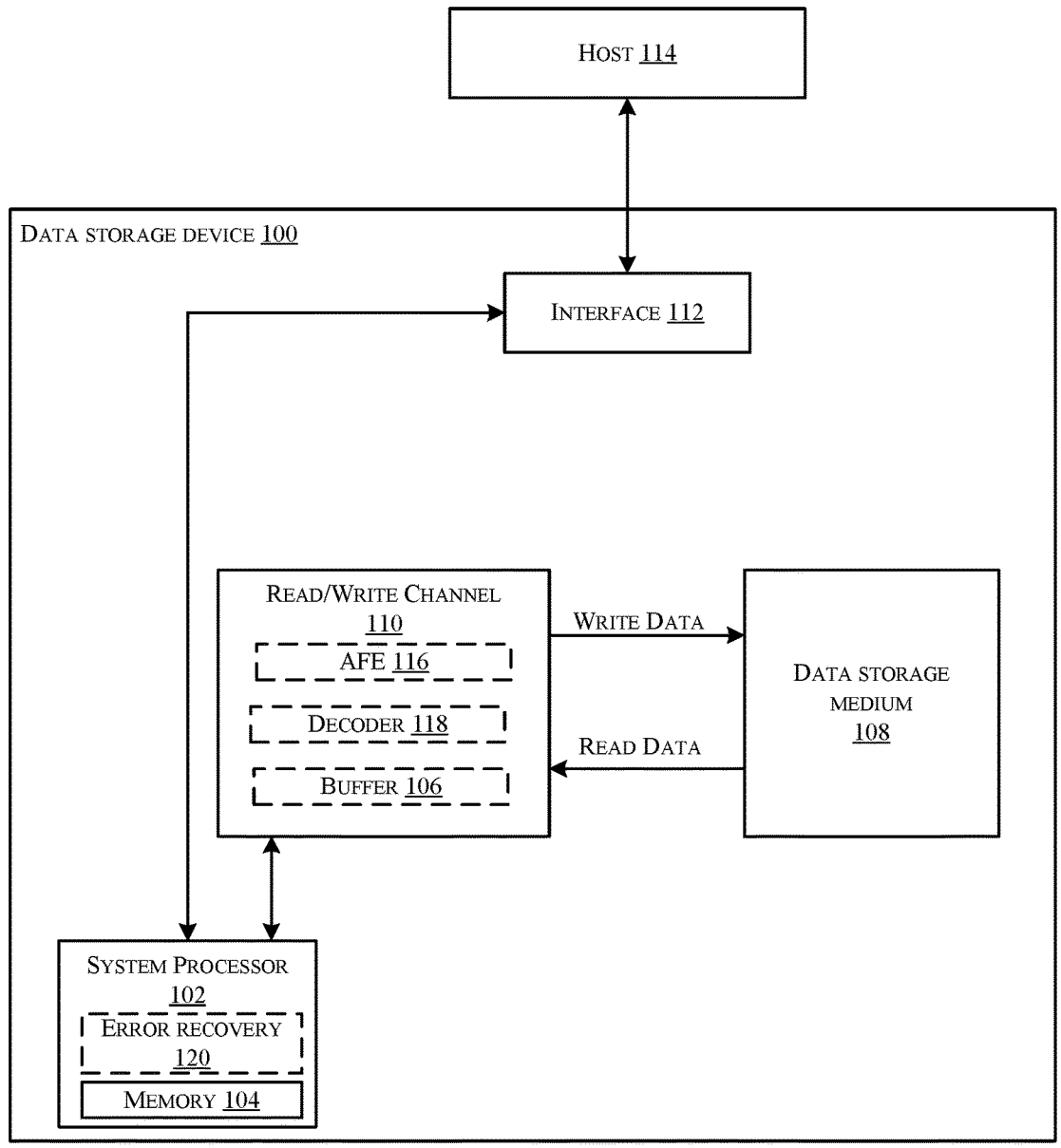
FIG. 1 is a simplified block diagram of an exemplary data storage device, in accordance with certain embodiments of the present disclosure.

In the following detailed description of the embodiments, reference is made to the accompanying drawings which form a part hereof, and in which are shown by way of illustrations. It is to be understood that features of the various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

In accordance with various embodiments, the methods and functions described herein may be implemented as one or more software programs running on a computer processor or controller. In accordance with another embodiment, the methods and functions described herein may be implemented as one or more software programs running on a computing device, such as a personal computer that is using a disc drive. Dedicated hardware implementations including, but not limited to, application specific integrated circuits, programmable logic arrays, and other hardware devices can likewise be constructed to implement the methods and functions described herein. Further, the methods described herein may be implemented as a computer readable storage medium or device including instructions that when executed cause a processor to perform the methods.

Embodiments of the disclosure may provide a method and apparatus for recovering data on a storage medium. When data is requested by a host from a storage device such as a hard drive, the requested data (e.g., incoming or read data) may be checked to ensure that it is error free. Requested data that contains errors (in other words, the requested data may not be error free) may result in what may be referred to as a data failure (e.g., a segment/sector failure, a unit/track failure, etc.). For example, a "per segment" or a "per code" check, such as low density parity check (LDPC) correction, may be performed on the fly, in error recovery or both but fail to recover the data. In response, the system may initiate an error recovery procedure.

Requested failed data may be decoded using various decoding techniques and/or the requested failed data may be attempted to be re-read from the storage medium. For example, a syndrome, such as an outer code syndrome, may be generated for a portion of requested data to indicate whether it contains errors. In some embodiments, the syndrome may be utilized to detect errors once the full data unit or outer code block is read.

Some embodiments herein may relate to efficiently ordering various decoding techniques and/or recovery processes in error recovery, for example, based on error type. In some embodiments, the error type may be determined by analyzing the bit information of one or more sectors. For example, the bit information of a sector may include bit in error (BIE) signal data and analog-to-digital converter (ADC) output for that sector. In some examples, the bit information and/or information derived from the bit information may be utilized to categorize an error. For example, the bit in error (BIE) signal data may include information about which bits in the sector are in error. Based on the categorization of the error, an appropriate recovery operation may be performed or a preferred order of execution of recovery operations may be utilized.

FIG. 1 is a simplified block diagram of an exemplary data storage device 100 that can be used in embodiments described herein. Data storage device 100 includes a system processor 102, which is used for controlling certain operations of data storage device 100. The various operations of data storage device 100 are controlled by system processor 102 with the use of programming stored in memory 104, which may be, for example, a dynamic random access memory (DRAM), in some embodiments. The memory 104 may include the capability of temporarily storing access operations pending execution by system processor 102. System processor 102 may be coupled to an optional read/write channel 110. In some embodiments, some of the functions of the system processor 102 may be performed by a recovery unit 120 of the system processor 102.

System processor 102 may execute read and write operations on data storage medium 108. In one embodiment, system processor 102 may also be used for carrying out data recovery from data storage medium 108. In some embodiments, data storage medium 108 may be one or more magnetic discs. In other embodiments, data storage medium 108 can be a collection of solid-state memory elements. These read/write operations executed by system processor 102 may be performed directly on data storage medium 108 or through the optional read/write channel 110.

Read/write channel 110 may receive data from system processor 102 during a write operation, and may provide encoded write data to data storage medium 108. During a read operation, read/write channel 110 may process a read signal in order to decode data recorded on data storage medium 108. The decoded data may be provided to system processor 102 and ultimately through an interface 112 to an external host 114. In some embodiments, some of the functions of the channel 110 may performed by an analog front end (AFE) 116, a decoder 118 and a buffer 106 of the channel 110. Further, in some examples, buffer 106 may temporarily store user data during read and write operations.

In some embodiments, the AFE 116 may include one or more of an analog-to-digital converter (ADC) and an equalizer. In operation, the ADC may convert an analog input signal (e.g. read data) read from the data storage medium into a digital signal. The digital signal may be output to the equalizer. The equalizer may then equalize the digital signal to generate an output signal. The output signal may be output to the decoder 118 for bit detection. In some examples, the decoder 118 may be an LDPC decoder. In some embodiments, the operations of the decoder may be referred to as on-the-fly decoding/recovery. If the decoder 118 fails to recover the data, the recovery unit 120 may operate to perform various recovery processes to recover the failed data. Details of an example embodiment of a recovery unit 120 are provided below with regard to FIGS. 3 and 4.

External host 114 may be a processor in an electronic device, such as a processor in a computing device. Although FIG. 1 illustrates external host 114 as being a single host, data storage device 100 may be connected through interface 112 to multiple hosts. Through interface 112, data storage device 100 may receive data and commands from external host 114 and may provide data and error codes to external host 114 based on commands executed by system processor 102.

Data storage medium 108 may include a plurality of data units (e.g. tracks or outer code blocks). Each data unit may be subdivided into a plurality of segments (e.g. sectors). As defined herein, a segment may be the basic unit of data storage on data storage medium 108. The segments may be identified and located at various positions on medium 108.

Figure 2A:
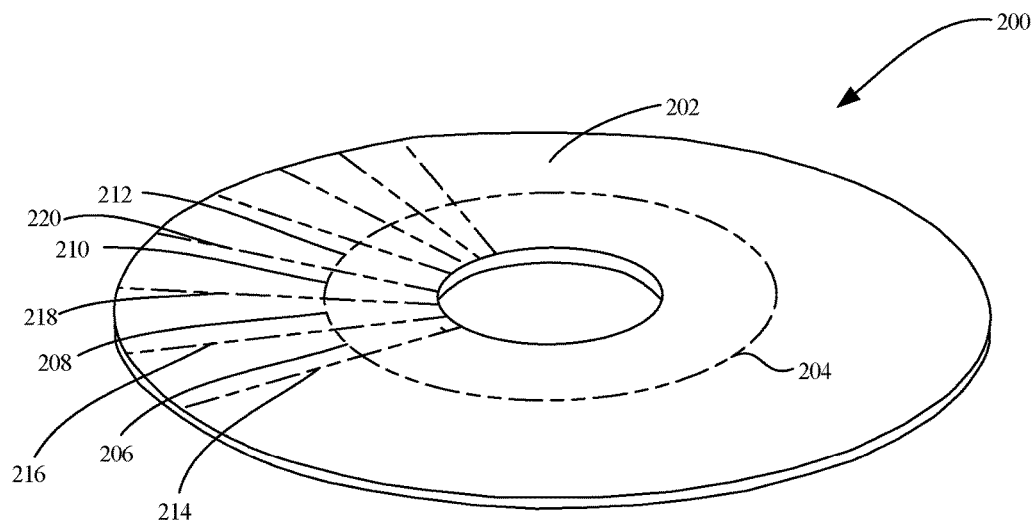
FIGS. 2A and 2B illustrate exemplary views of a storage medium, in accordance with certain embodiments of the present disclosure.
Figure 2B:
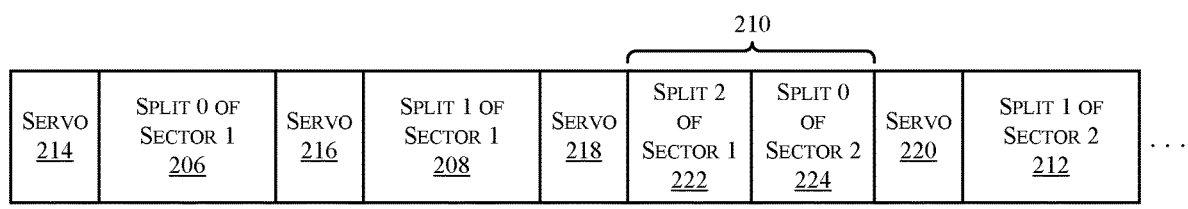

As previously discussed, data storage medium 108 may include one or more magnetic discs. FIG. 2A illustrates such an exemplary disc storage medium 200. In FIG. 2A, storage medium 200 may include a surface 202 having a plurality of substantially concentric circular tracks (e.g., data units), such as data track 204. In some embodiments, the data tracks on storage medium 200 may be logically divided into a plurality of data sectors (e.g., segments) and may include a plurality of servos which may split the data sectors. Each sector may be identified and located at various positions on disc 200. In the disc-type medium example illustrated in FIG. 2A, segments or data sectors may be "pie-shaped" angular sections of a track that are bounded on two sides by radii of the disc and on the other side by the perimeter of a circle that may define the track. For example, data track 204 may be logically divided into data sectors which may be split by servo information. In particular, as shown in FIG. 2B, data track 204 that may be divided into a sector 1 which may include a split 0 206, a split 1 206 and a split 2 222 divided by servos 214, 216 and 218. This pattern may repeat, for example, after split 2 222 of sector 1 with a split 0 224 of a sector 2 beginning in the section 210 of the data track 204 between servos 218 and 220, which may be followed by a split 1 212 of sector 2, and so on.

Each track or data unit may have a related logical block addressing (LBA). For disc-type storage media, the LBA may include a cylinder address, head address and sector address. A cylinder may identify a set of specific tracks on the disc surface of each disc 116 which may lie at equal radii and may generally be simultaneously accessible by a collection of transducing heads in a data storage device. The head address may identify which head can read the data and therefore may identify which disc from the plurality of discs 200 the data is located on. As mentioned above, each track within a cylinder may be further divided into sectors for storing data. The data sector may be identified by an associated sector address.

With reference back to FIG. 1 and in embodiments described in more detail below, system processor 102 may implement a two-level parity encoding system to detect and correct data errors. These embodiments may organize data into two sets of groupings in which the first set of groupings may be encoded by an inner code such as LDPC and the second set of groupings may be encoded by an outer code such as a Reed-Solomon code.

As discussed above, some embodiments may operate to categorize an error (e.g., a failure of the decoder 118 to recover data) based on bit information and, based on the category of the error, determine an appropriate recovery operation to be performed or a preferred order of execution of recovery operations to be utilized.

In some examples, the error may be categorized into initial weak write errors, errors from a defect or defects in the zero gain start (ZGS), or adjacent track erasure (ATE) errors. For each category of error, a preferred recovery operation or a preferred order of execution of recovery operations utilized may be defined. For example, in some embodiments, the preferred recovery operation associated with ZGS defect errors may be outer code (OC) recovery. In such an embodiment, OC recovery may be selected in response to a characterization of an error as a ZGS defect error. Implementations are not limited to these example categories. Other categories would be apparent to one of ordinary skill in the art in view of this disclosure.

As mentioned above, various types of recovery may be performed. Some example may include adjacent track interference cancellation (ATIC), stochastic-event recovery voting (SERV), and outer code (OC) recovery, each of which may be preferred for recovery from one or more specified types of error. In some examples, the preferred recovery process for an error categorized as an adjacent track erasure error may be ATIC, the preferred recovery process for an error categorized as an initial weak write error may be SERV and the preferred recovery technique for an error categorized as a ZGS defect error may be OC recovery. Implementations are not limited to these example recovery processes or to the example preferred recovery process to error type matching discussed above. Other processes and matching would be apparent to one of ordinary skill in the art in view of this disclosure. In addition, some embodiments may utilize the disclosed error type categorization systems and processes for purposes other than error recovery. For example, in some embodiments, the error type categorization may be utilized to detect errors during manufacturing, such as to determine areas of a disc surface which should be labeled unusable.

Figure 3:
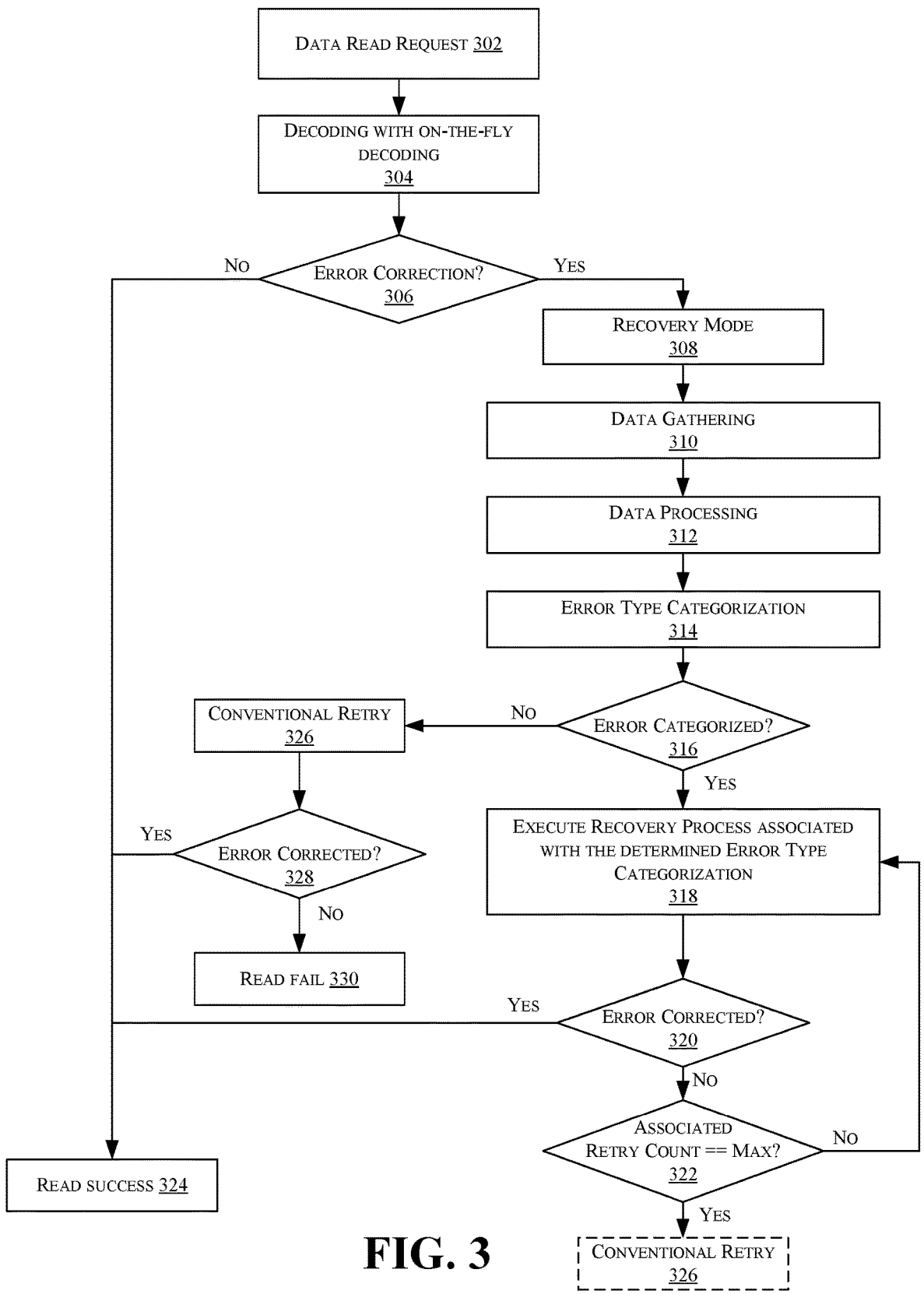
FIG. 3 is a flowchart illustrating a method of error categorization based on bit information, in accordance with certain embodiments of the present disclosure.

FIG. 3 illustrates a method 300 of error recovery selection under some embodiments. More specifically, method 300 may determine an error type by analyzing the bit information of one or more data segments and, based on the categorization of the error, an associated recovery process may be selected and performed or a preferred order of execution of recovery operations may be selected and utilized.

In operation, a data read may be initialized at 302. For example, in a magnetic storage system, a read request may be received. A servo arm of the magnetic storage system may be controlled to seek a track in which the requested data is located. A read head may detect magnetic variation on the magnetic storage media and may provide an analog signal to a read channel. The analog signal may be processed by an analog-to-digital converter and an equalizer. The resulting digital signal may be provided to a decoder.

At 304, the decoder may attempt to decode the bits of the segments (e.g. sectors) requested by the data read operation using the inner code of the segments. For example, the decoder may be a low density parity check (LDPC) decoder using LDPC codes. The decoder may buffer information such as bit-in-error data and a current decoding state for a current iteration. If the decoding attempt fails (e.g. after a number of iterations), the buffer may contain information generated during the final iteration. This information may be read-failed information and may contain errors.

At 306, a determination is made whether error recovery should be initiated, for example, if one or more bits of the segment or unit were not recovered. If so, the process may continue to 308. Otherwise, the process may continue to 324 where the process may return the decoded data to the requesting host.

At 308, the system may initiate a recovery mode. At 310, data may be gathered for usage in determining a type of the error. For example, data may be gathered from the decoder, for example, a low density parity check (LDPC) decoder. In some embodiments, the data may be gathered from the buffer of the decoder.

At 312, the gathered data may be processed. For example, the processing may generate analytic data useful in determining the type or category of the error. At 314, the error type may be detected based on the bit information and the information derived by the data processing. For example, in some embodiments, error symptoms may be inferred by statistically analyzing the data. For example, by comparing scope and buffer data, error symptoms may be detected and may be utilized to categorize the error type. Additional details of an example embodiment of items 312-314 are provided below.

At 316, the process may determine whether the error has been categorized. If so, the process may continue to 318. Otherwise, the process may continue to 326.

At 318, the recovery process or processes associated with the detected error type may be executed. At 320, the process determines whether the errors have been corrected and the read data recovered. If so, the process may continue to 324. Otherwise, the process may continue to 322.

At 322, the process may determine whether an associated retry count has reached a maximum. If so, the process may continue to 326. Otherwise, the process may return to 318 for an additional recovery attempt At 326, a conventional retry may be performed (e.g., if the error was not characterized at 314 or if a maximum retry count is reached at 322). At 328, the process may determine whether the conventional retry was successful. If so, the process may continue to 324. Otherwise, the process may continue to 330 and the data read may end as failed.

As discussed above, at 310-316, data may be gathered and processed; the error may be categorized based on the processed data; and recovery processes may be executed based on the determined error category. The following discussion provides an example embodiment in which LDPC buffer data is utilized to categorize the error as one of an initial weak write error type, a defect in the zero gain start (ZGS) error type, or an adjacent track erasure (ATE) error type.

An initial weak write error may occur due to a weak signal at the beginning of a write operation. In heat-assisted magnetic recording systems, such a weak signal may result from a write heater not being fully saturated at the beginning. In some examples, an initial weak write error may be detected based on the beginning portion of the segment having a weak signal envelope.

A defect on the zero gain start may occur when the ZGS region has damage or defect. In such cases, the read channel may mistakenly determine that the segment amplitude is weak and may increase an amplitude gain. As a result, the signal amplitude of the beginning portion of the segment may be highly boosted. In addition, the signal amplitude may come back to a normal value at the end portion of the segment due to adaptation.

An adjacent track erasure error may occur due to an offset write in an adjacent track. In terms of signal, the signal amplitude may become weak when at least some of a beginning portion or an end portion of the segment is damaged or the signal at the beginning portion of the sector may be boosted when the ZGS region is damaged.

Based on the above noted symptoms of the various error types included in the example embodiment, the error may be categorized by analyzing the gathered data as follows.

Symptoms of an initial weak write error may be detected by monitoring a signal envelope difference between the samples proximate the beginning and end of the data segment, for example, the first and last samples. The signal envelope may be determined based on, for example, the output of the ADC or equalizer of the read channel.

Symptoms of a defect on the ZGS error may be detected by monitoring saturation point difference of a signal amplitude between samples proximate the beginning and end of the data segment, for example, the first and last samples. The saturation point may be determined based on, for example, the output of the ADC or equalizer of the read channel. For example, the saturation point may be determined based on a moving average of the output of the ADC or equalizer of the read channel.

Symptoms of an ATE error may be detected by monitoring BIE difference between samples proximate the beginning and end of the data segment, for example, the first and last samples. In some examples, the error recovery unit may determine an error vector mode from the BIE data. The error vector mode may then be utilized to detect ATE errors.

Figure 4:
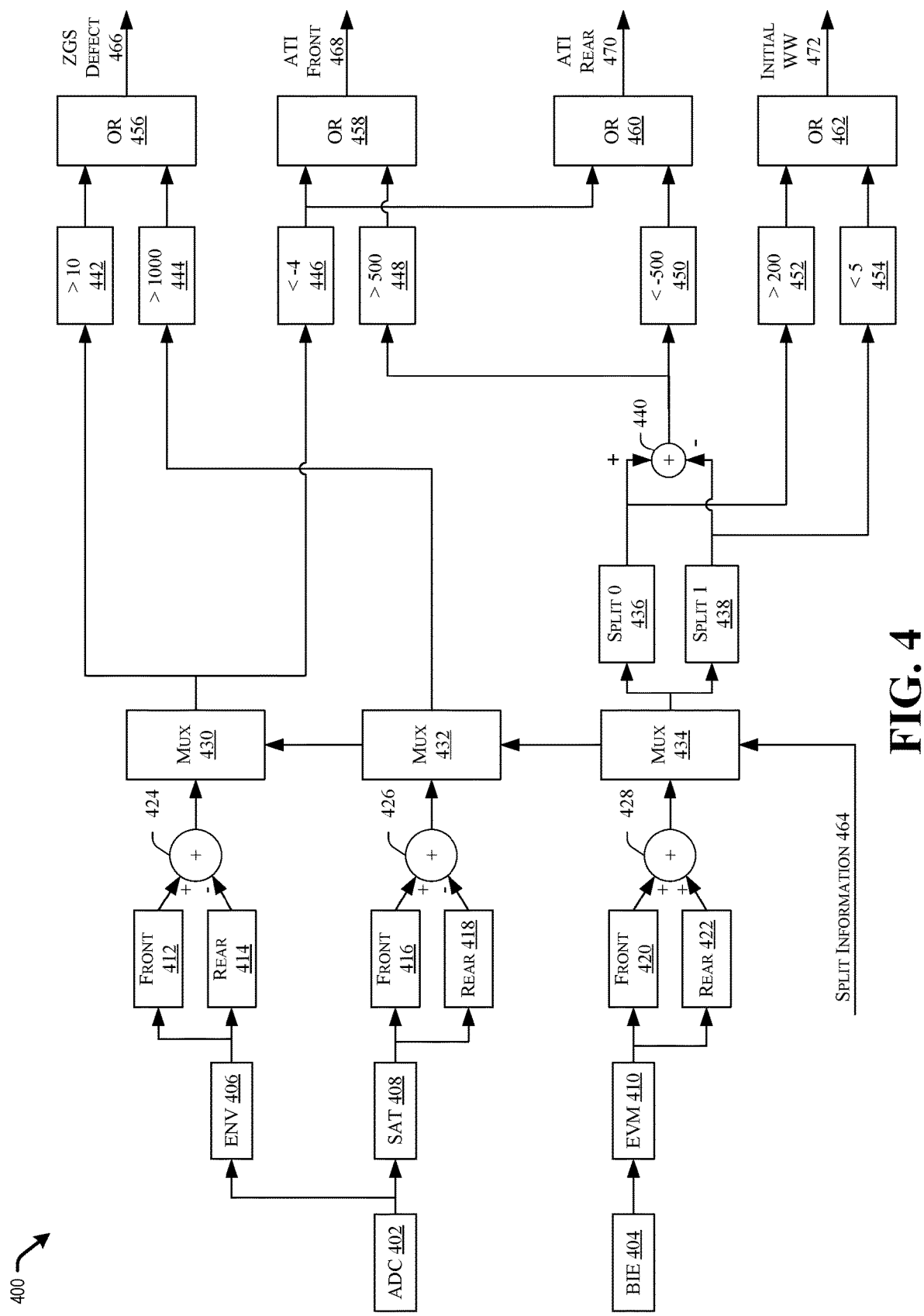
FIG. 4 illustrates an example data flow of an embodiment that performs error categorization based on bit information, in accordance with certain embodiments of the present disclosure.

Referring to FIG. 4, a block diagram of a system of error recovery selection is shown and is generally designated 400. In particular, system 400 may be an example portion of an error recovery unit that may select an error recovery process based on bit information. In particular, the system 400 may include an ADC unit 402, a bit in error unit (BIE) 404, an envelope analysis unit (ENV) 406, a saturation analysis unit (SAT) 408, error vector monitoring unit (EVM) 410, pairs of front units 412, 416, and 420 and rear units 414, 418 and 422, adders 424-428, multiplexers 430-434, a split 0 unit 436 and a split 1 unit 438, an adder 440, comparator units 442-454, and OR units 456-462.

Each of the items 402-464 may be a separate circuit, part of a system on chip (SOC), firmware, a processor(s), or other system not listed, or any combination thereof.

In general, during an error recovery procedure, the system 400 may accept analog-to-digital converter information and bit in error information (e.g. from an LDPC buffer of an LDPC decoder) as well as split information 464 and may categorize an error based on an analysis of the inputs as one of a zero gain start (ZGS) defect error 466, an adjacent track interference (ATI) front error 468, an ATI rear error 470 and an initial weak write error 472.

In operation, the ADC 402 may gather bit information output from, for example, one or more of an ADC and an equalizer. For example, the ADC unit 402 may gather raw ADC output data for use in determining an error category. Similarly, the BIE 404 may gather bit information from, for example, a decoder buffer. In some embodiments, the BIE 404 may gather bit-in-error for use in determining an error category.

The ENV 406 may receive gathered data from the ADC 402. Based on the data received from the ADC 402, the ENV 406 may generate signal envelope data. In some examples, the envelope of a signal may represent a smooth curve outlining the extremes of the signal. The signal envelope data may be output to the front unit 412 and the rear unit 414. More particularly, in some examples, the front unit 412 may buffer the signal envelope data for a sample proximate to the beginning of the segment being recovered (e.g. the first sample) and the rear unit 414 may buffer the signal envelope data for a sample proximate the end of the segment being recovered (e.g. the last sample).

The SAT unit 408 may receive gathered data from the ADC 402. Based on the data received from the ADC 402, the SAT 408 may generate saturation data. In some examples, the saturation data may be determined as a moving average of the raw ADC output. The saturation data may be output to the front unit 416 and the rear unit 418. More particularly, in some examples, the front unit 416 may buffer the saturation data for a sample proximate to the beginning of the segment being recovered (e.g. the first sample) and the rear unit 418 may buffer the saturation data for a sample proximate the end of the segment being recovered (e.g. the last sample).

The EVM unit 410 may receive gathered data from the BIE 404. Based on the data received from the BIE 404, the EVM 410 may generate error vector mode (EVM) data. In some examples, the EVM data may detect high bit error density area. The error vector mode data may be output to the front unit 420 and the rear unit 422. More particularly, in some examples, the front unit 420 may buffer the error vector mode data for a sample proximate to the beginning of the segment being recovered (e.g. the first sample) and the rear unit 422 may buffer the error vector mode data for a sample proximate the end of the segment being recovered (e.g. the last sample).

The front unit 412 and the rear unit 414 may output the signal envelope data for the sample proximate to the beginning of the segment being recovered (e.g. the first sample) and the signal envelope data for the sample proximate the end of the segment being recovered (e.g. the last sample) to the adder 424. The adder 424 may generate a difference by subtracting the data received from the rear unit 414 from the data received from the front unit 412 and output the result to mux 430.

The front unit 416 and the rear unit 418 may output the saturation data for the sample proximate to the beginning of the segment being recovered (e.g. the first sample) and the saturation data for the sample proximate the end of the segment being recovered (e.g. the last sample) to the adder 426. The adder 426 may generate a difference by subtracting the data received from the rear unit 418 from the data received from the front unit 416 and output the result to mux 432.

The front unit 420 and the rear unit 422 may output the EVM data for the sample proximate to the beginning of the segment being recovered (e.g. the first sample) and the EVM data for the sample proximate the end of the segment being recovered (e.g. the last sample) to the adder 428. The adder 428 may generate a sum by adding the data received from the rear unit 422 from the data received from the front unit 420 and output the result to mux 434.

As illustrated in FIG. 4, each of mux 430, 432 and 434 may receive split information 464. The split information 464 may indicate the locations in the current sector which are split by servo information (e.g. as shown in FIGS. 2A and 2B). In operation, the mux 430 may output the envelope difference determined by the adder 424 for each split of the current sector to comparator units 442 and 446. Similarly, the mux 432 may output the saturation difference determined by the adder 426 for each split of the current sector to comparator unit 444. The mux 434 may output the sum of the EVM data determined by the adder 428 for split 0 of the current sector to the split 0 buffer 436 and the sum of the EVM data for split 1 of the current sector to the split 1 buffer 438.

The split 0 buffer 436 may output the EVM data for split 0 to the adder 440 and the comparator unit 452. The split 1 buffer 438 may output the EVM data for split 1 to the adder 440 and the comparator unit 454. The adder 440 may determine the difference in the EVM data for split 0 and split 1 of the current sector and output the result to the comparator units 448 and 450.

Each of the comparator units 442-454 may compare its respective input to the illustrated example values and output a logical true or logical false signal based on the result. In particular, comparator units 442 and 444 may output to OR unit 456, comparator unit 446 may output to OR units 456 458 and 460, comparator unit 448 may output to OR unit 458, comparator units 450 may output to OR unit 460, and comparator units 452 and 454 may output to OR unit 462.

As discussed above, if one of OR units 456-460 receives a logical true input from a comparator unit 442-454, the OR unit may output a respective error detection (e.g. one of a zero gain start (ZGS) defect error 466, an adjacent track interference (ATI) front error 468, an ATI rear error 470 and an initial weak write error 472).

Many variations would be apparent in view of this disclosure. For example, while the above discussion was primarily in the context of magnetic storage media such as hard disc drives, the systems and techniques disclosed herein are applicable many other storage technologies such as flash drives, hybrid drives, and so on. In addition, the data units/outer code blocks discussed herein may be tracks, collection of tracks, collection of sectors in multiple tracks, hybrid blocks that may include intermediate parity sectors in memory with user sectors on media, pages, blocks, dies, planes, or the like in a flash drive, and so on. Components and circuits used to perform the operations in the method may be discrete, integrated into a system on chip (SOC), or other circuits. Further, the steps can be carried out in a processor (e.g. a digital signal processor), implemented in software, implemented via firmware, or by other means.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, the figures and above description provide examples of architecture and voltages that may be varied, such as for design requirements of a system. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
a circuit configured to perform data bit error recovery for one or more data segments read from a data storage medium, including:
receive bit information corresponding to the one or more data segments from an analog to digital converter;
categorize a type of data error in the one or more data segments based on a comparison of the bit information to known types of data errors that cause a bit error to occur in the data segment, including:
determine the type of data error is an adjacent track erasure (ATE) error based on the bit information;
select a first error recovery operation to perform in a configurable sequence of error recovery operations based on the type of data error, including:
select the first error recovery operation to be adjacent track interference cancellation (ATIC) based on the type of data error being the ATE error; and
perform the first error recovery operation to correct the bit error in the one or more data segments.

2. The apparatus of claim 1, further comprising:
the circuit further configured to gather at least part of the bit information from a buffer of a decoder that failed to recover the one or more data segments.

3. The apparatus of claim 2, further comprising the decoder being a low density parity check (LDPC) decoder.

4. The apparatus of claim 2, further comprising the bit information including bit-in-error data indicating which bit of the one or more data segments is the bit error.

5. The apparatus of claim 1, further comprising the circuit configured to:
process the bit information to determine:
a saturation point difference for at least one data segment;
a signal envelope difference for at least one data segment; and
an error vector mode difference for at least one data segment.

6. The apparatus of claim 1, further comprising the circuit further configured to:
process the bit information to generate at least one of:
a saturation point difference for a first sample and a last sample of at least one data segment;
a signal envelope difference for a first sample and a last sample of at least one data segment; and
an error vector mode difference for a first sample and a last sample of at least one data segment.

7. The apparatus of claim 1, comprising the circuit further configured to:
determine the type of data error is an initial weak write error when the bit information indicates a beginning portion of at least one data segment has a weak signal envelope relative to an end portion of the at least one data segment; and
select the first error recovery operation to be stochastic-event recovery voting (SERV) based on the type of data error being the initial weak write error.

8. The apparatus of claim 1, comprising the circuit further configured to:
determine the type of data error is the ATE error from the bit information based on an error vector mode indicating a bit-in-error (BIE) difference between a beginning of at least one data segment and an end of the at least one data segment;
determine the type of data error is a zero gain start (ZGS) defect from the bit information based on a saturation point difference of a signal amplitude between the beginning of the at least one data segment and the end of the at least one data segment; and
select the first error recovery operation to be outer code (OC) recovery based on the type of data error being the ZGS defect.

9. The apparatus of claim 1, comprising the circuit further configured to:
determine an order in which to perform a plurality of error recovery operations in the configurable sequence of error recovery operations, starting with the first error recovery operation, based on the type of data error.

10. The apparatus of claim 1, comprising the circuit further configured to:
maintain a retry count during the data bit error recovery;
when the first error recovery operation fails to recovery the one or more data segments:
increment the retry count;
determine whether the retry count is greater than a threshold; and
perform the first error recovery operation again when the retry count is not greater than the threshold.

11. A data storage device storing instructions that, when executed, cause a processor to perform a method comprising:
performing error recovery operations in a configurable order to recover a bit error in one or more data segments based on a determined type of data error, including:
receiving bit information corresponding to the one or more data segments read from a data storage medium;
comparing the bit information to characteristics of error types;

determining a type of data error that resulted in the bit error based on the comparison, including determining the type of data error is an initial weak write error based on the bit information;

configuring the order of error recovery operations by selecting a first error recovery operation from a plurality of error recovery operations based on the determined type of error, the plurality of error recovery operations including multiple error recovery operations that correspond to correcting different error types, including:

selecting the first error recovery operation to be stochastic-event recovery voting (SERV) based on the type of data error being the initial weak write error; and performing the first error recovery operation to correct the bit error in the one or more data segments.

12. The data storage device of claim 11, storing instructions that, when executed, cause the processor to perform the method further comprising:

gathering at least part of the bit information from a buffer of a decoder that failed to recover the one or more data segments, the bit information including bit-in-error data indicating which bits of the one or more data segments are in error.

13. The data storage device of claim 11, storing instructions that, when executed, cause the processor to perform the method further comprising:

processing the bit information to determine:
a saturation point difference for at least one data segment;
a signal envelope difference for at least one data segment; and
an error vector mode difference for at least one data segment.

14. The data storage device of claim 11, storing instructions that, when executed, cause the processor to perform the method further comprising:

determining the type of data error is the initial weak write error when the bit information indicates a beginning portion of a first at least one data segment has a weak signal envelope relative to an end portion of the first at least one data segment; and determining the type of data error is a zero gain start (ZGS) defect from the bit information based on a saturation point difference of a signal amplitude between a beginning of a second at least one data segment and an end of the second at least one data segment;

selecting the first error recovery operation to be outer code (OC) recovery based on the type of data error being the ZGS defect;

determining the type of data error is an adjacent track erasure (ATE) error from the bit information based on an error vector mode indicating a bit-in-error (BIE) difference between a beginning of a third at least one data segment and an end of the third at least one data segment; and selecting the first error recovery operation to be adjacent track interference cancellation (ATIC) based on the type of data error being the ATE error.

15. The data storage device of claim 11, storing instructions that, when executed, cause the processor to perform the method further comprising:

determining an order in which to perform the plurality of error recovery operations, starting with the first error recovery operation, based on the type of data error.

16. A method comprising:

selecting, using an error correction circuit, a configurable order of performing error recovery operations for one or more data segments based on a determined type of data error, including:

receiving bit information corresponding to the one or more data segments read from a data storage medium;

categorizing the type of data error based on analyzing the bit information for characteristics corresponding to known types of data errors that cause a bit error in the one or more data segments, including:

determining the type of data error is a zero gain start (ZGS) defect based on the bit information;

modifying the configurable order of performing the error recovery operations by selecting a first error recovery operation to perform based on the type of data error, from a plurality of error recovery operations corresponding to different error types, including:

selecting the first error recovery operation to be outer code (OC) recovery based on the type of data error being the ZGS defect; and performing the first error recovery operation to correct the bit error in the one or more data segments.

17. The method of claim 16 further comprising:

gathering at least part of the bit information from a buffer of a decoder that failed to recover the one or more data segments, the bit information including bit-in-error data indicating which bits of the one or more data segments are in error.

18. The method of claim 16 further comprising:

processing the bit information to determine:
a saturation point difference for at least one data segment;
a signal envelope difference for at least one data segment; and
an error vector mode difference for at least one data segment.

19. The method of claim 16 further comprising:

determining the configurable order in which to perform multiple error recovery operations, starting with the first error recovery operation, based on the type of data error.

20. The method of claim 16 further comprising:

determining the type of data error is the ZGS defect from the bit information based on a saturation point difference of a signal amplitude between a beginning of a first at least one data segment and end of the first at least one data segment;

determining the type of data error is an initial weak write error when the bit information indicates a beginning portion of a second at least one data segment has a weak signal envelope relative to an end portion of the second at least one data segment;

selecting the first error recovery operation to be stochastic-event recovery voting (SERV) based on the type of data error being the initial weak write error;

determining the type of data error is an adjacent track erasure (ATE) error from the bit information based on an error vector mode indicating a bit-in-error (BIE) difference between a beginning of a third at least one data segment and an end of the third at least one data segment; and selecting the first error recovery operation to be adjacent track interference cancellation (ATIC) based on the type of data error being the ATE error.

\* \* \* \* \*